United States Patent [19]

Mitacek et al.

[11] Patent Number: 5,747,585
[45] Date of Patent: May 5, 1998

[54] PROCESS FOR SYNTHESIZING LATEX POLYMERS FROM SOLID MONOMER PARTICLES

[75] Inventors: Paul Mitacek; Peter John Ghyzel, both of Rochester; Tienteh Chen, Penfield, all of N.Y.

[73] Assignee: Eastman Kodak Company, Rochester, N.Y.

[21] Appl. No.: 390,449

[22] Filed: Feb. 17, 1995

[51] Int. Cl.$^6$ .................................... C08L 67/00
[52] U.S. Cl. ................. 524/845; 524/501; 524/502
[58] Field of Search .................... 524/845, 501, 524/502

[56] References Cited

U.S. PATENT DOCUMENTS

| | | |
|---|---|---|
| 3,814,742 | 6/1974 | Nagy . |
| 3,819,597 | 6/1974 | Richards . |
| 3,926,436 | 12/1975 | Monbaliu et al. . |
| 4,340,664 | 7/1982 | Monbaliu et al. . |
| 4,355,142 | 10/1982 | Khungar et al. . |
| 4,642,323 | 2/1987 | Ranka et al. . |
| 5,037,906 | 8/1991 | Davis . |
| 5,043,404 | 8/1991 | Mahabadi et al. ............ 526/194 |
| 5,292,836 | 3/1994 | Kitamura et al. . |
| 5,310,832 | 5/1994 | Ohnishi et al. . |

FOREIGN PATENT DOCUMENTS

| | | |
|---|---|---|
| 0 185 793 | 7/1986 | European Pat. Off. . |
| 44 43 752 | 6/1996 | Germany . |
| 61-062501 | 3/1986 | Japan . |

OTHER PUBLICATIONS

Naidus, H. "Emulsion Polymers for Paints", Industrial and Engineering Chemistry, vol. 45, No. 4, pp. 712–717, Apr. 1953.

J.M.G. Cowie, Chemistry and Physics of Modern Materials, 1991, p. 61.

P.J. Flory, Principles of Polymer Chemistry, 1953, pp. 127–128.

*Primary Examiner*—Jeffrey T. Smith
*Attorney, Agent, or Firm*—Paul A. Leipold

[57] ABSTRACT

The invention comprises a method of polymerization comprising providing a stream of fine solid monomer particles dispersed in water; bringing said monomer particles stream into contact with an aqueous initiator solution at a rate such that it immediately reacts to form polymer particles in said solution to form a latex emulsion.

37 Claims, 2 Drawing Sheets

PROCESS FOR SYNTHESIZING LATEX POLYMERS FROM SOLID MONOMER PARTICLES

FIELD OF THE INVENTION

This invention relates to a novel process of making polymer latexes from solid monomer particles that are insoluble in water. The preferred form of the invention relates to the formation of photographically useful particles by the process.

BACKGROUND OF THE INVENTION

This invention relates to the novel process of making polymer latexes from solid hydrophobic monomers. These polymer latexes are prepared by the emulsion polymerization method. Emulsion polymerizations are well known in the art and are described in: (1) F. A. Bovey, Emulsion Polymerization, Interscience Publishers Inc., New York, 1955; (2) C. Schildknecht and I. Skeist, Polymerization Process, pp. 143–197, Wiley-Interscience Publication, NY, 1977; and (3) R. Fitch, Polymer Colloid II, Plenum Press, NY, 1980. Emulsion polymerization is one of the most important polymerization methods because of the following advantages: (1) the molecular weight of the polymer is much higher than that produced by other methods; (2) the heat of polymerization is easier to dissipate because the aqueous reaction medium is not viscous; (3) it is environmentally friendly because no organic solvents are used; (4) high molecular weight polymers with high % solid and low viscosity can only be prepared by emulsion polymerization; and (5) the polymer latex obtained can be used directly, such as in photographic, adhesive and coating industries, without further processing.

The possibilities for emulsion polymerization of monomers are limited by the fact that these monomers need be dispersed in liquid form. As the term emulsion polymerization implies, it is first necessary for the monomer to be dispersed in the form of oil droplets in the aqueous phase consistent with the theory that Harkins proposed for the emulsion polymerization of styrene, and with which most other liquid monomers comply (J. Am. Chem. Soc., 69, 1428 (1947); J. Polymer Sci., 5, 217 (1950)). When a water-immiscible organic monomer is dispersed in water in the presence of a surface-active emulsifying agent, the monomer is mainly dispersed in droplets with a diameter on the order of 1 um to 1 mm and these droplets are stabilized by the emulsifier (or surfactants). A small amount of the monomer, however, is solubilized in micelles formed by emulsifier. Radicals formed by decomposition of a polymerization catalyst, e.g., persulfate, initiate the polymerization solely in the micelles, which are thereby progressively transformed in polymer particles swollen by monomer. The monomer in these particles is consumed as polymerization proceeds but is continuously replenished by diffusion from the monomer droplets through the aqueous phase. The monomer droplets are thus acting as highly dispersed reservoirs of monomers.

From the Harkins theory, it is not difficult to understand that solid monomers, with melting point higher than the polymerization temperature and with relatively low solubility in water, cannot be transformed to polymer latex by emulsion polymerization because they cannot diffuse trough the aqueous phase in order to supply the monomer to the loci of the polymerization.

There are few methods known in the art for the preparation of emulsion polymers from solid hydrophobic monomers. The first method, reported in Japanese patent JP 8662501 A2, JP 6162501, and EP 0 321 399, is to liquefy the monomers by melting them before polymerization. The liquid monomer solution has to be heated during the feeding of monomers to the polymerization vessel, otherwise, the monomers will solidify again and become unpumpable. By heating the solid monomer at elevated temperature, spontaneous and premature polymerization might occur. Bulk polymerization of the melted monomer would then be in competition with the emulsion polymerization reducing the yield of latex. For melting to be feasible in emulsion polymerization, the monomer must melt below water's boiling point of 100° C. This limits the choice of solid phase monomers which can be polymerized.

The second method is to dissolve the solid monomer and other comonomers in an inert solvent and deliver the monomer solution to the polymerization vessel containing water, surfactant, and initiator either batchwise or semi-continuously. This method is reported in U.S. Pat. No. 4,080,211. The use of inert solvents has several disadvantages. First, the inert solvent usually needs to be removed by distillation or diafiltration after the polymerization which increases the manufacturing cost and adds a waste stream to the process. Second, the inert solvent interferes with the function of surfactants used in emulsion polymerization and reduces the colloidal stability of the polymer latex. Latex made by this method might coagulate during the polymerization or upon storage. This polymerization method was also mentioned in the following patents: U.S. Pat. No. 4,474,870, U.S. Pat. No. 3,926,436, U.S. Pat. No. 3,767,412, JP 61062501, JP 93086410, BP 1,247,688, EP 0 294 681, GB 2,116,738, and WO 2,725,591.

U.S. Pat. No. 3,926,436 and EP 0 185 793 describe an emulsion polymerization process in which the organic cosolvent and emulsifying agent are not required but an ionic comonomer containing sulfonate functional group is required. The solid coupler monomer, the liquid comonomer, and the ionic comonomer are mixed in the polymerization vessel prior to the polymerization. However, the yields of polymerization are not satisfactory because the water-immiscible liquid comonomer aggregates with the solid monomer and a large agglomerate is obtained after the polymerization. Also, the composition of the polymers prepared by this method will not be homogeneous if the reactivities of the solid monomer and liquid monomer are different.

U.S. Pat. No. 4,340,664 describes another emulsion polymerization process where organic cosolvent is not required but an ionogenic comonomer that contains a hydrophobic hydrocarbon chain of at least 8 carbon atoms and a strong hydrophilic group formed by a sulfonic, sulfuric, or phosphonic acid group or the salt thereof is required. A suspension comprised of solid coupler monomer, liquid water-immiscible hydrophobic comonomer, and ionogenic monomer was added stepwise to the polymerization vessel. However, these ionogenic comonomers are difficult to synthesize and increase the manufacturing cost. The liquid water-immiscible hydrophobic monomer forms large aggregates with the solid monomer in the aqueous suspension. The suspension obtained is not homogeneous and impossible to pump to the polymerization vessel with precise control. The yield of the polymerization is usually not satisfactory.

PROBLEM TO BE SOLVED BY THE INVENTION

There remains a need for an efficient and practical process for emulsion polymerization and copolymerization of monomers which are insoluble in water and solid at room temperature. There is a need for an efficient method of copolymerizing monomers that are solid at room temperature. There is also a need to copolymerize monomers solid at room temperature with those that are liquid at room temperature.

SUMMARY OF THE INVENTION

An object of this invention to provide an efficient and practical process for the emulsion polymerization and copolymerization of ethylenically unsaturated monomers, which are relatively insoluble in water, which are capable of undergoing free radical addition polymerization, and which are solid at room temperature.

Another object of this invention is to provide an efficient and practical process for the copolymerization of solid ethylenically unsaturated monomer and liquid hydrophobic monomer via emulsion polymerization.

These and other objects of the invention are generally accomplished by a method of polymerization comprising providing a stream of fine solid monomer particles dispersed in water; bringing said monomer particle stream into contact with an aqueous initiator solution at a rate such that it immediately reacts to form polymer particles in said solution to form a latex emulsion.

ADVANTAGEOUS EFFECT OF THE INVENTION

The invention has the advantage that it provides an efficient low cost way of forming latex polymers from monomers that are solid at room temperature. Previous processes were less efficient and more costly. The invention is low cost and highly efficient in producing a high percentage of polymer during the process from the monomer that is processed. The invention also provides a method of forming copolymers of different solid water insoluble monomers, as well as copolymers of solid at room temperature monomers with monomers that are liquid at room temperature.

DETAILED DESCRIPTION OF THE INVENTION

Figure 1:
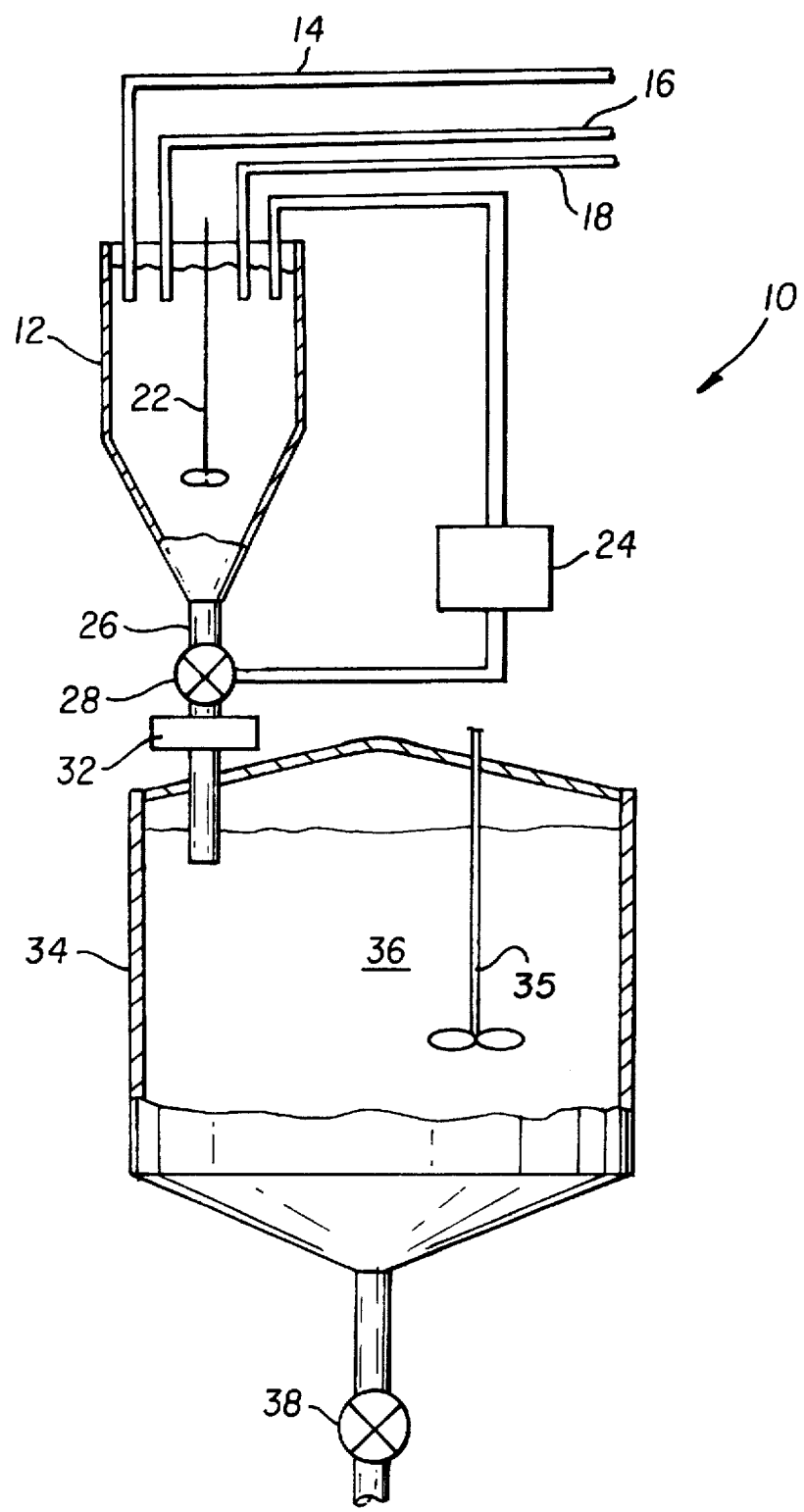
FIG. 1 is a schematic illustration of apparatus for performing the process of forming a latex polymer from solid monomer particles.

Illustrated in the schematic illustration of FIG. 1 is the apparatus for performing the process of the invention. The apparatus 10 comprises a head tank 12 into which are fed water from a pipe 14, a surfactant from pipe 16 and a solid monomer from supply means 18. In the head tank 12 which is agitated by stirrer 22 the monomer is treated by a shearing device 24. The material is withdrawn through outlet 26 passing through the shearing device 24 and being returned to the tank 12. This process is carried out until a satisfactory small size of solid monomer is reached. The particle size distribution is generally between 2000 and 5 micrometers. The preferred size distribution is between about 500 and 10 micrometers for a high recovery of latex polymer. When the solid monomer dispersion is dispersed in a satisfactory manner, valve 28 is opened and material is pumped by pump 32 in a carefully controlled manner into reactor 34 which agitated by stirrer 35. It is noted that the pumping by pump 32 is carefully controlled such that the mixture 36 in reactor 34 stays in a monomer starved condition. Mixture 36 comprises water, polymerization initiator, and surfactant prior to the introduction of the solid monomer. The apparatus is operated in a semi-continuous manner such that the entire amount of solid monomer dispersion exits the tank 12 and is formed into latex polymer in reactor 34 prior to removal of the latex dispersion from reactor 34 by passing through valve 38. It is noted that when the solid monomer is added by device 18, it may be a mixture of particles of solid monomers of different composition which will form a latex copolymer in reactor 34.

Figure 2:
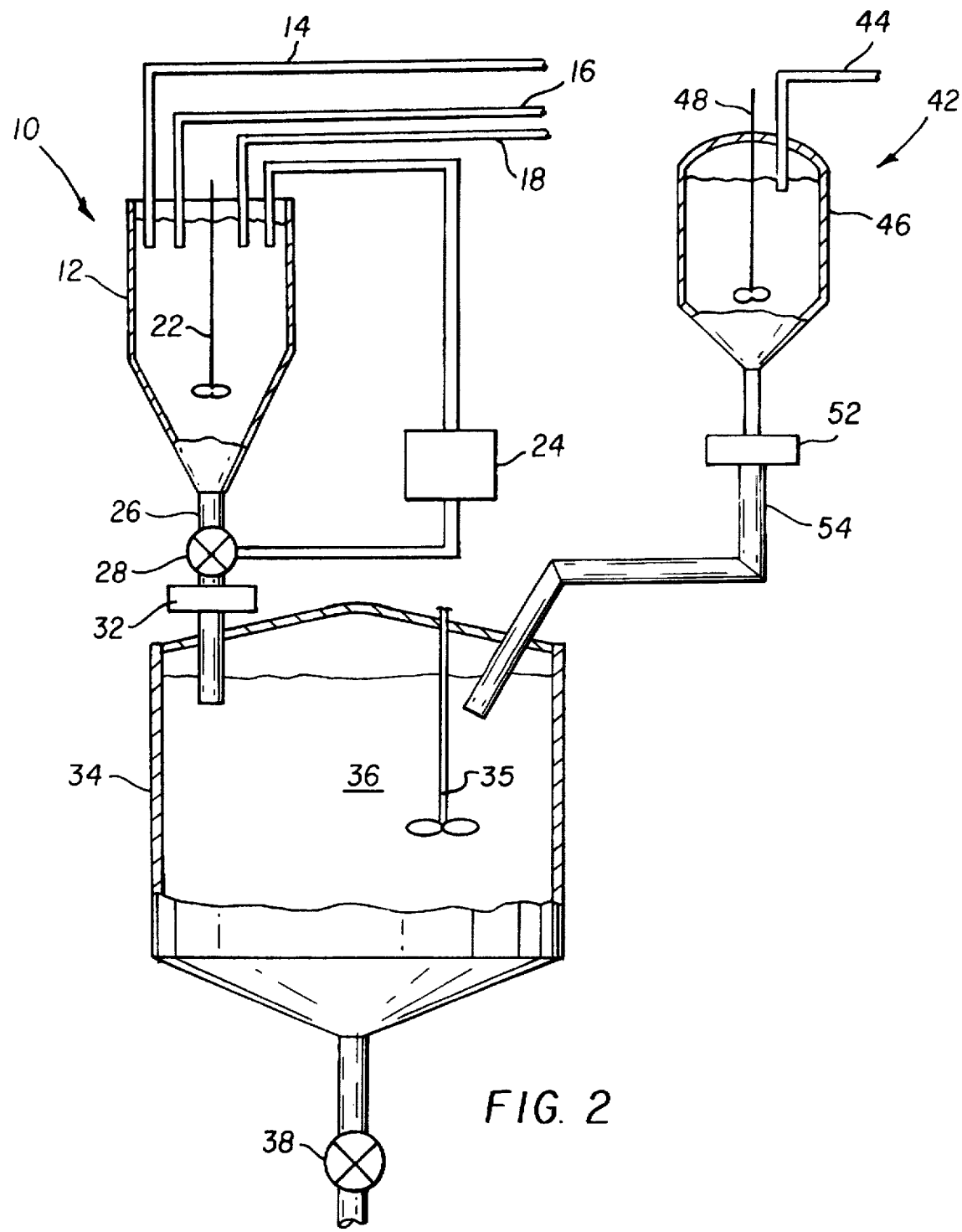
FIG. 2 is a schematic illustration of a process for forming latex copolymers from solid monomer particles and liquid hydrophobic monomers.

In FIG. 2 there is illustrated a preferred embodiment of the invention in which to the apparatus 10 for forming a polymer latex from solid monomer is added apparatus 42 for delivery of a liquid monomer to the reactor 34 for formation of the latex copolymer. Apparatus 42 comprises a delivery pipe 44 for furnishing a hydrophobic, liquid ambient temperature, monomer to tank 46. The tank 46 is provided with stirrer 48 to mix desirable additives, such as oil-soluble initiator, second comonomer, chain-transfer agents, or to maintain the dispersion of the hydrophobic monomer in an aqueous solution with a surfactant if so desired. The hydrophobic liquid monomer is delivered by pump 52 through line 54 into the reactor 34 where it will react to form a copolymer latex with the solid monomer that is delivered in a controlled amount also by pump 32. It is noted that the mixture 36 is also maintained in a monomer starved condition when the copolymer is formed from the liquid at room temperature monomer and the solid at room temperature monomer.

In summary, a process has been now found for the polymerization of water-insoluble, ethylenically unsaturated, solid monomers, which are capable of undergoing free radical addition polymerization in water, which comprises the steps of:

(a) dispersing water-insoluble, ethylenically unsaturated, solid monomers in water containing an emulsifying agent(s) to form a finely dispersed and pumpable solid dispersion. A shearing device, such as a homogenizer, a colloid mill, or an ultrasonication device, may be used;

(b) a separate vessel containing a water-immiscible, ethylenically unsaturated, liquid monomer if it is required to form a desirable copolymer;

(c) adding to the solid dispersion obtained by step (a) a known water-soluble polymerization initiator or to the liquid monomer by step (b) a known water-insoluble polymerization initiator;

(d) adding solid dispersion obtained by step (a) to a polymerization vessel in a semi-continuous or continuous mode under free-radical polymerization condition. If liquid water-insoluble comonomer is desired for the copolymer composition, the solid dispersion obtained by step (a) and the liquid monomer by step (b) are fed separately and concurrently to the polymerization vessel under semi-continuous or continuous conditions. The definition of semi-continuous and continuous addition of monomers to the polymerization vessel is well-known in the field of polymer synthesis.

This process is very different from the conventional emulsion polymerization in that the solid monomer could not be emulsified or form a liquid dispersion at the polymerization temperature as required in conventional emulsion polymerization. Polymer latex prepared from solid monomer by this process have many advantages: (1) high % solids; (2) low amount of coagulum (high latex yield); (3) no need for inert organic solvents; (4) no need of ionogenic comonomer; (5) small particle size; (6) excellent control of polymer composition; and (7) easy heat removal. None of the methods described in the prior art offers all of these advantages.

The schematic diagram of this invention is shown in FIGS. 1 and 2. An important factor to this invention is that the solid, water-insoluble, ethylenically unsaturated monomer is added to the polymerization reactor as a solid dispersion or slurry slowly and in a controlled manner such that the reactor is always monomer starved. If all of the solid monomer is charged to the polymerization reactor at once, the product is ill-defined, and the yield is generally low. This is especially true when a hydrophobic liquid comonomer is used in a copolymerization. The addition of the dispersion of solid monomer to the reactor is slow enough that the reactor is always in a monomer starved condition such that the monomer is very rapidly converted to polymer. The very rapid conversion to polymer and slow addition prevents the coagulation of the material such that polymerization would not be complete and the particle size would be larger than desired.

In this process the solid monomer and, if needed, the liquid hydrophobic comonomer are fed into the polymerization vessel over a time sufficiently long enough to prevent the agglomeration of solid monomer dispersion with the liquid hydrophobic monomer in the polymerization vessel. The feeding rate is kept at monomer starved condition, i.e., less than the rate of polymerization of monomers, to ensure their complete and homogeneous polymerization. Under monomer starved conditions, the instantaneous composition of the polymer formed is equal to the ratio of the monomers fed into the polymerization vessel. This is especially important if the reactivity ratios of various monomers are very different. The amount of coagulum formed is also reduced to the minimum under monomer starved conditions. The total feeding time of solid monomer and hydrophobic monomer can vary over wide range of time and does not need to be the same. If both finish at the same time, a homogeneous polymer will be obtained. If one is fed over a longer period of time, a polymer latex with a layered structure or a so-called core-shell type of latex will be obtained. A discussion of semicontinuous polymerization and the monomer starved condition is described in (1) J. Guillot, A. Guyot, C. Pichot, Copolymer Latex Morphology in "Scientific Methods for the Study of Polymer Colloids and Their Applications (edited by F. Candau, R. H. Ottewill)", Kluwer Academic Publishers, p.103–105(1990). and (2) Wessling, R. A., J. Applied Polym. Sci., 12, p. 309 (1968).

The liquid hydrophobic monomers used for the copolymerization with solid monomers defined above are liquid at room temperature and the solubility in water is less than 5% at room temperature. These include an ester, preferably a lower alkyl ester derived from acrylic acid(for example, methyl acrylate, ethyl acrylate, n-propylacrylate, n-butyl acrylate, 2-ethoxyethylacrylate, 2-methoxyethylacrylate, t-butyl acrylate, isobutyl acrylate, 2-ethylhexyl acrylate, n-octyl acrylate, lauryl acrylate, 2-ethoxyethyl acrylate, 2-methoxyethyl acrylate, methyl methacrylate, ethyl methacrylate, n-butyl methacrylate, hydroxylethyl methacrylate, glycidylacrylate, glycidylmethacrylate, etc.), a vinyl ester (for example, vinyl acetate, vinyl propionate, vinyl laurate), acrylonitrile, methacrylonitrile, an aromatic vinyl compound (for example, styrene and a derivative thereof, for example, vinyl toluene, divinylbenzene, vinyl acetophenone), a vinyl alkyl ether (for example, vinyl ethyl ether, etc.), an ester of maleic acid. Of these monomers, an ester of acrylic acid, an ester of methacrylic acid, and aromatic vinyl compounds are particularly preferred.

The liquid monomer which is soluble both in water and in hydrophobic liquid monomer can be fed into the polymerization vessel either way. These include acrylic acid, methacrylic acid, itaconic acid, citraconic acid, crotonic acid, N-vinylpyrrolidone, 2-vinylpyridyne, 4-vinylpyridyne, and 2-hydroxyethylacrylate. The solid monomer which is water-soluble is usually added to the solid dispersion. Examples of these are acrylamide, methacryl-amide, hydroxymethylacrylmide, hydroxymethylmethacrylamide, and 2-acryloamidoglyconic acid.

The concentration of solid monomer in dispersion (a) above may vary from 0.5 to 50%. Preferably, the concentration of solid monomer in the solid dispersion (a) is between 5 to 40%. Two or more different solid monomers may be blended together in the same solid dispersion. The solubility of solid monomer in this invention is preferably less than 1% in water at ambient temperature. As used herein, the term solid monomer particle is intended to refer to a particle that has a solubility in water in ambient temperature of less than 5% and has a melting temperature above 21° C. The amount of emulsifying agent used to stabilize the solid dispersion is between 0.1 and 20% and, preferably, between 2 to 10% based on the total weight of solid monomer. A large number of surface-active compounds are suitable as emulsifying agents, such as soaps, alkylsulfonate and sulfates, cationic compounds, amphoteric compounds, nonionic surfactants, and high molecular weight protective colloids. A complete list of emulsifying agents can be found in McCutcheon's Emulsifiers & Detergents, MC Publishing Co., Glen Rock, N.J., U.S.A. Examples are sodium N-methyl-N-oleoyltaurate, α-olefin sulfonate, sodium dodecylbenzene sulfonate, sodium dodecyl sulfate, sodium or ammonium salt of sulfated nonylphenoxypoly(ethyleneoxy) ethanol, sodium alkylnaphthalene sulfonate, ethoxylated alkylphenols, monoethanolamine dodecyldiphenyloxide disulfonate, derivatives of sulfosuccinate, poly(ethyleneoxy-b-propyleneoxy), sodium salt of alkylaryl polyether sulfonate, poly(saccharides), sucrose and glucose esters and derivatives. Preferred emulsifying agents are sodium N-methyl-N-oleoyltaurate, and α-olefin sulfonate as these materials provide a good suspension of the material and when used with photographic materials do not provide difficulties in the photographic process.

The free-radical polymerization of solid monomer is initiated by the addition to the monomer molecule of a free radical that has been formed either by thermal decomposition, by the oxidation-reduction reaction, or by physical action such as by UV light or other high energy radiation, ultrasonic waves, etc. A more complete list of initiating agents is given in F. A. Bovey, Emulsion Polymerization, Interscience Publishers, Inc., New York, (1955), p. 59–93. Water-soluble initiators are preferred and can be added to the solid dispersion, to the polymerization vessel, or both. Examples are the salt of persulfate (sodium, potassium, and ammonium), hydrogen peroxide, 4,4-azobis (4-cyanovaleric acid), 2,2'-azobis (2-methyl-N-(2-hydroxyethyl)propionamide), 2,2'-azobis(2-methyl-N-(1,1-bis(hydroxymethyl)ethyl) propionamide, 2,2'azobis(N,N'-dimethyleneisobutyramide) dihydrochloride, hydrogen peroxide-$Fe^{+3}$, persulfate-metabisulfite, persulfate-bisulfite, persulfate-sodium formaldehyde sulfoxylate, t-alkyl hydroperoxide, sodium formaldehyde sulfoxylate, etc. Examples of oil-soluble initiators include azobis (isobutyronitrile), dimethyl 2,2'-azobisisobutyrate, alkyl hydroperoxide, etc. The amount of catalyst is usually from 0.01 to 5% by weight, preferably 0.1 to 3.0% by weight of the total monomers. The preferred free radical polymerization initiator is sodium persulfate as this material gives a high yield of the polymer latex and rapid polymerization.

Water-soluble ionogenic monomers containing carboxylic acid, sulfonic acid, sulfuric acid, and phosphoric acid functional groups are not required in this invention for synthetic purposes but may be used to modify the physical properties of polymer latex such as particle size and latex stability. Examples of these ionogenic monomers are 2-sulfoethylmethacrylate, 3-sulfopropyl-methacrylate, sodium styrene sulfonate, sodium styrene sulfonate, 2-acryloamido-2-methyl-1-propanesulfonic acid, acrylic and methacrylic acid. Surface-active ionogenic monomers, such as examples in U.S. Pat. No. 4,340,664, can also be used to modify the physical properties of polymer latex. The ionogenic monomers can be added to the solid dispersion or to the polymerization vessel directly. The preferred water soluble ionogenic monomer for use in the process is the 2-acryloamido-2-methyl-1-propanesulfonic acid as this material provides a stable polymer latex dispersion.

A buffering agent can also be used to control the pH of the polymerization medium. Examples of buffering agents include sodium bicarbonate, sodium carbonate, potassium phosphate, potassium hydrogen phosphate, potassium hydrogen phthalate, sodium acetate, sodium succinate, and Borax.

If desired, water-miscible organic solvents can also be added to the solid dispersion as long as it does not deteriorate the stability of solid dispersion. Examples of these solvents are low molecular weight alcohols such as methanol, ethanol, isopropanol, ketones such as acetone and methyl ethyl ketone, acetamides such as N,N-dimethyl-formamide, and cyclic ethers such as tetrahydrofuran, etc. These organic solvents can be added to the solid dispersion, to the hydrophobic liquid monomer, or to the polymerization vessel. The organic solvent, if used, usually needs to be removed by distillation or diafiltration which is disadvantageous.

A shearing or grinding device such as a homogenizer, a colloid mill, a microfluidizer, or an ultrasonication device can be used to reduce the particle size of the solid dispersion to make it easier to pump to the polymerization vessel. The particle sizes may be any size that forms a suitable polymer latex with a high percentage of latex polymer being formed. Generally the particle size suitable for the invention and which may be formed by the mechanical devices set forth is between about 5 and 2000 micrometers. A preferred size is between about 10 and about 500 micrometers for relatively rapid milling and rapid and complete polymerization. The solid dispersion or slurry should be kept agitated to prevent settling of solid particles. Many types of pumping devices, such as diaphragm pumps, peristaltic pumps, centrifugal pumps, etc. can be used as long as steady feed rates can be obtained.

This method of preparing polymer latexes from solid, water-insoluble monomer can be applied to various industries, such as the photographic industry, the pharmaceutical industry, the dye industry, the plastic industry, the coating industry, and the paper industry.

The compounds of the following formulas are examples of solid, ethylenically unsaturated, polymerizable monomers which can be polymerized according to the process of this invention.

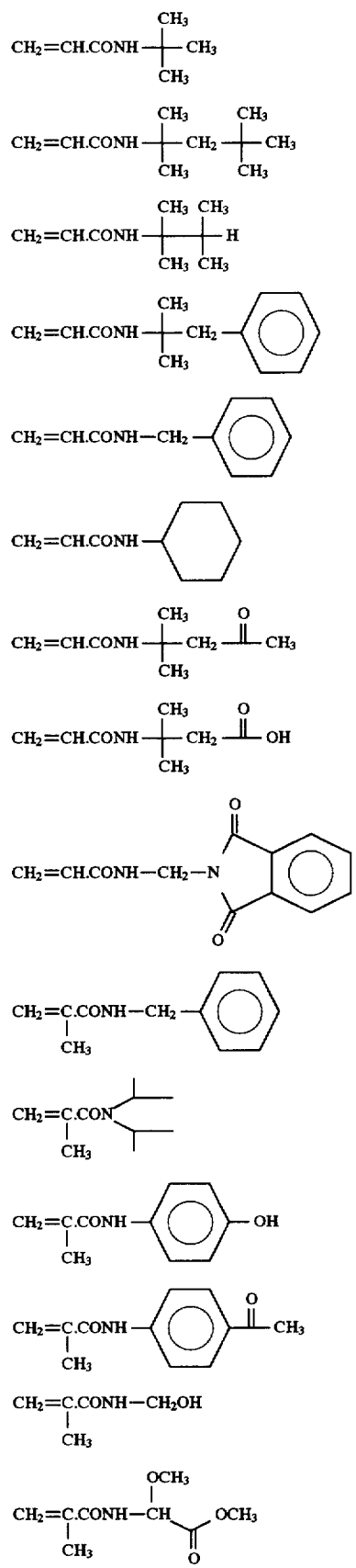

-continued

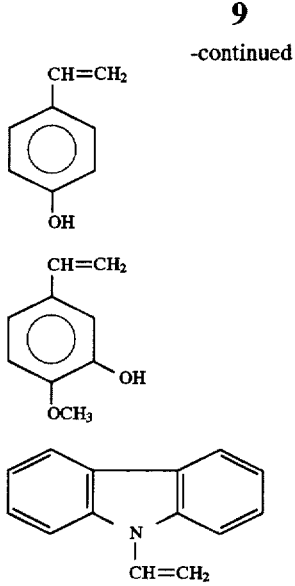

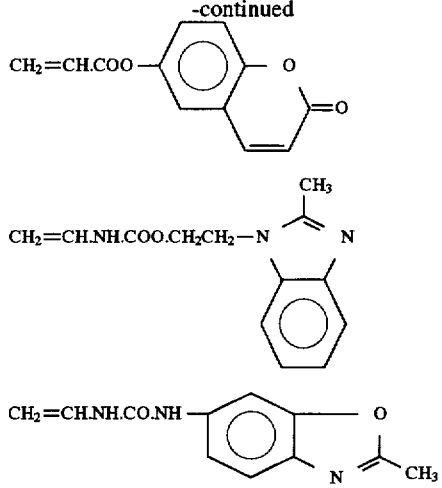

-continued

The compounds of the following formulas are examples of solid, ethylenically unsaturated, polymerizable monomers containing photographically useful groups which can be polymerized according to the process of this invention. Photographically useful groups include UV absorbers and-visible filter dyes, optical brighteners, oxidized developer scavengers, couplers, couplers that release PUG upon coupling with oxidized developer including development inhibitor releasing couplers, development inhibitor anchimerically releasing couplers, bleach accelerator releasing couplers, developer releasing couplers, reducing agent releasing couplers of any type, electron transfer agent releasing couplers, silver halide solvents, releasing couplers, silver halide developers, sensitizing dyes for silver halides, image stabilizers, fogging agents, anti-fogging agents, chemical stabilizer, antioxidants, as well as precursors thereof. List of solid monomers containing photographically useful groups are described in U.S. Pat. No. 5,234,807 columns 21 through 160 and U.S. Pat. No. 4,663,272 columns 11 through 32.

Preferred examples of solid monomers containing UV absorbers are set forth below.

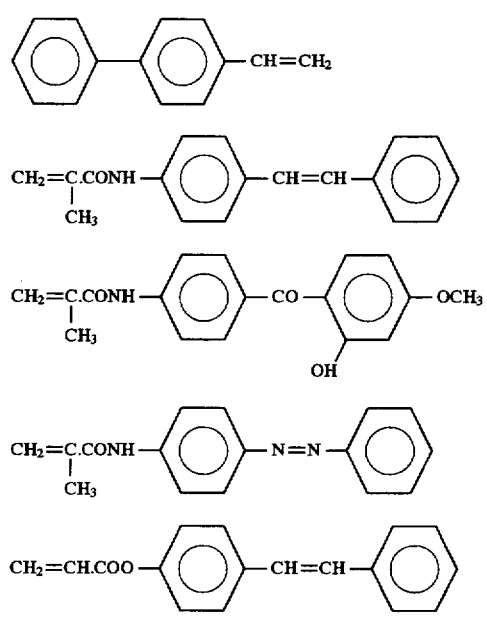

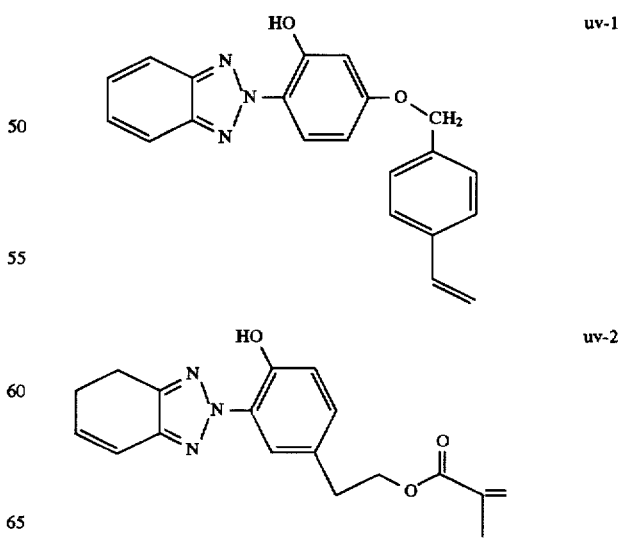

-continued
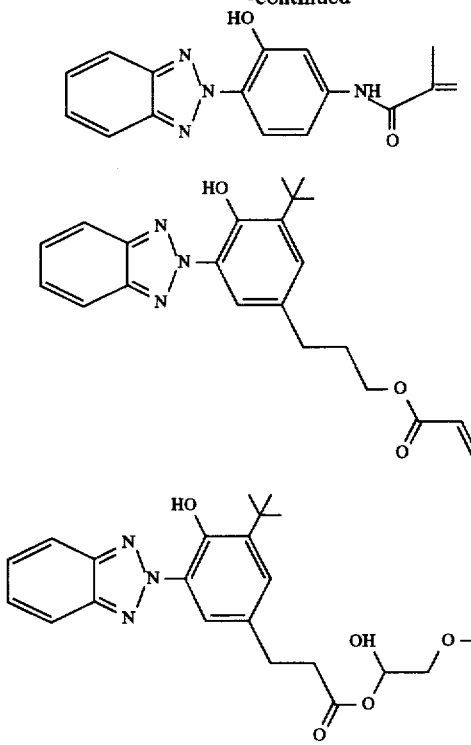
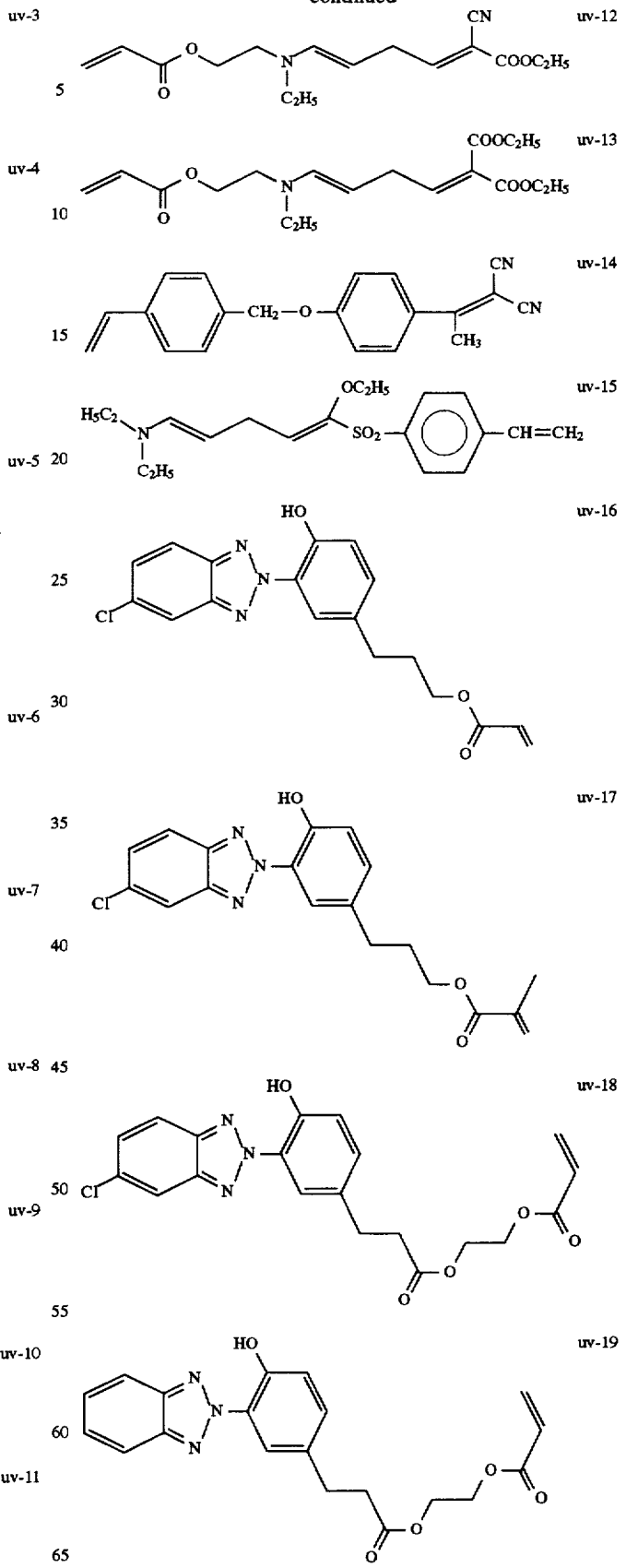

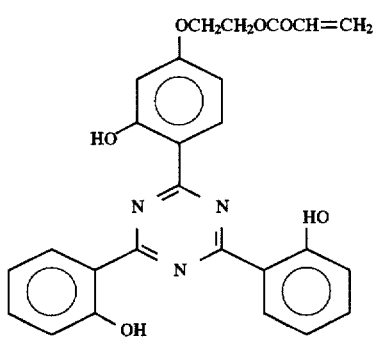
UV-20
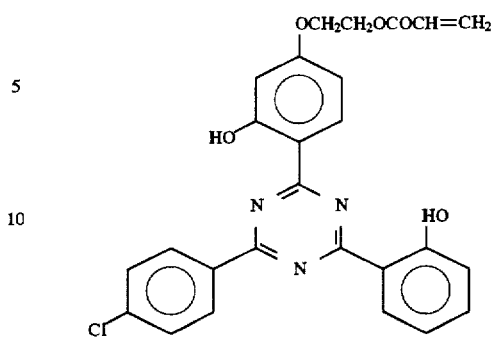
UV-21
Preferred examples of magenta, cyan, and yellow solid coupler monomers are set forth below.
Magenta Solid Monomers
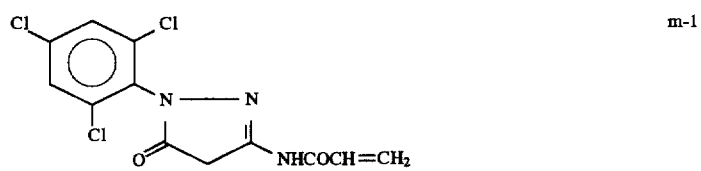
m-1
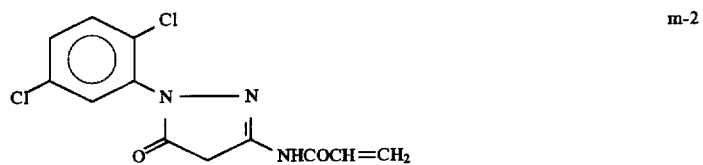
m-2
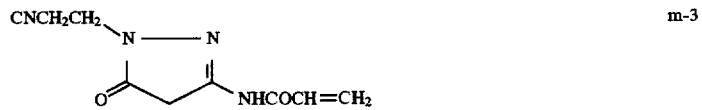
m-3
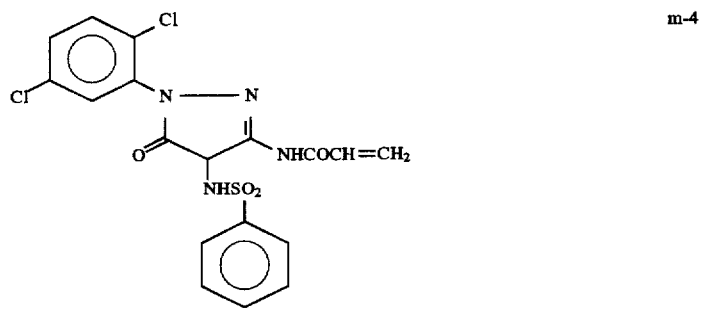
m-4
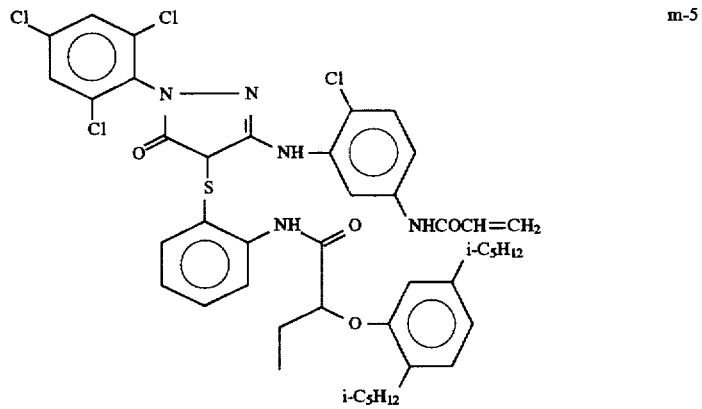
m-5

-continued
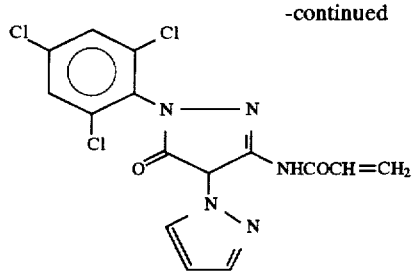
m-6
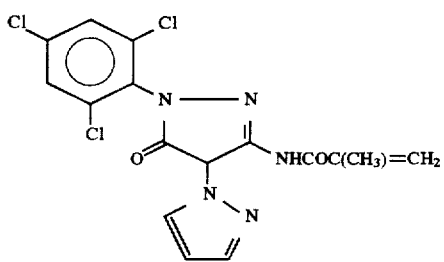
m-7
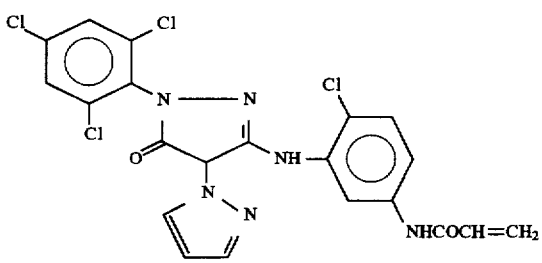
m-8
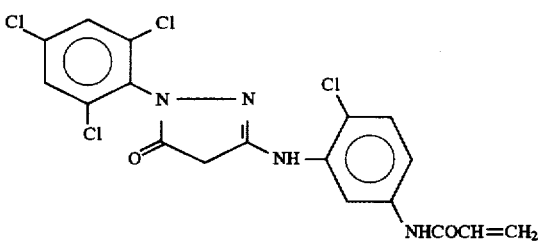
m-9
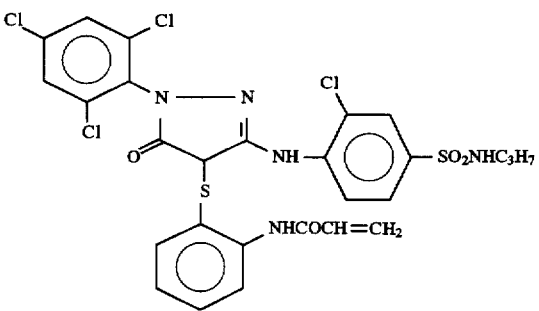
m-10
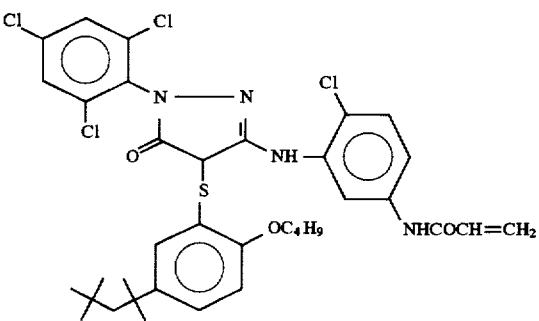
m-11

-continued
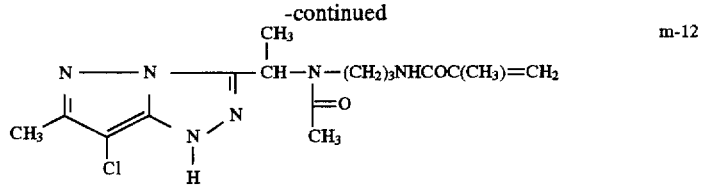
m-12
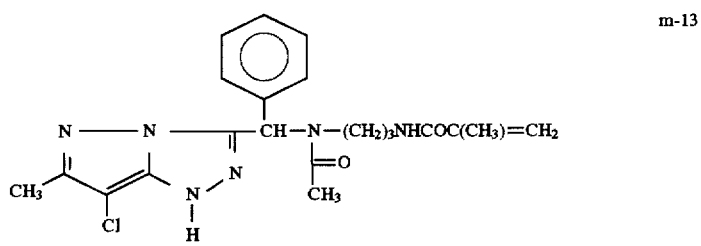
m-13
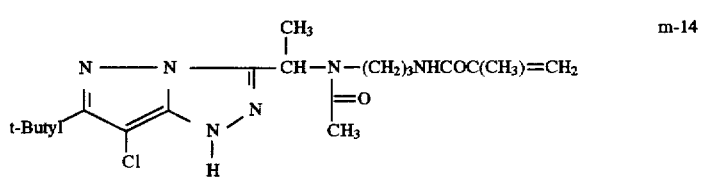
m-14
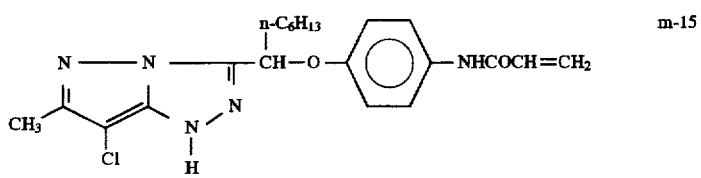
m-15
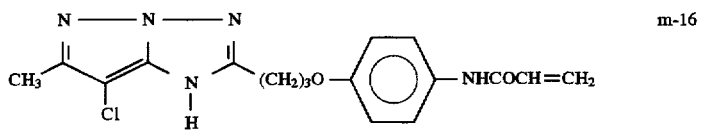
m-16
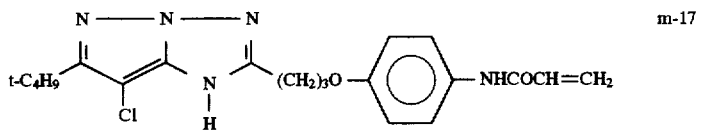
m-17
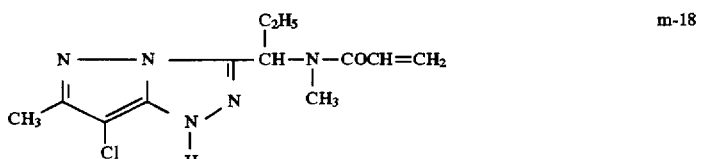
m-18
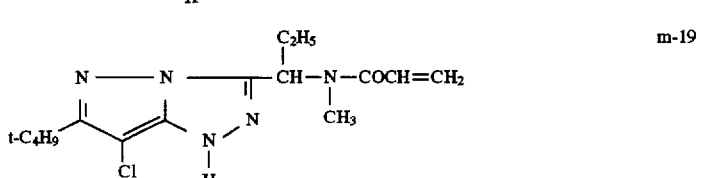
m-19
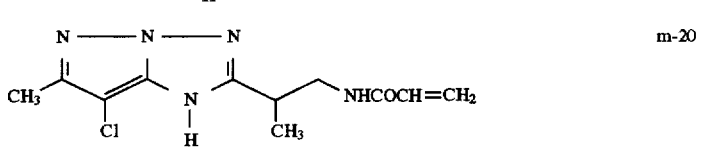
m-20
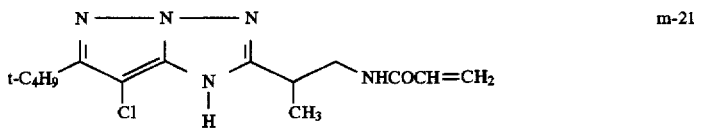
m-21

Cyan Solid Monomers
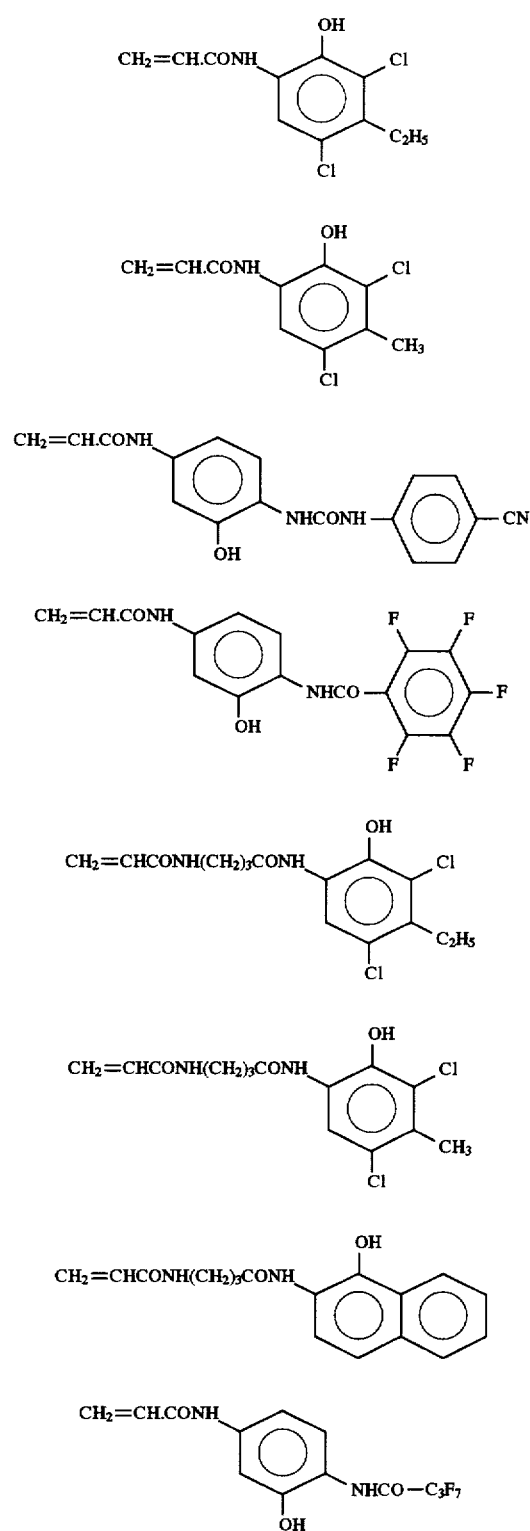
Yellow Solid Monomers
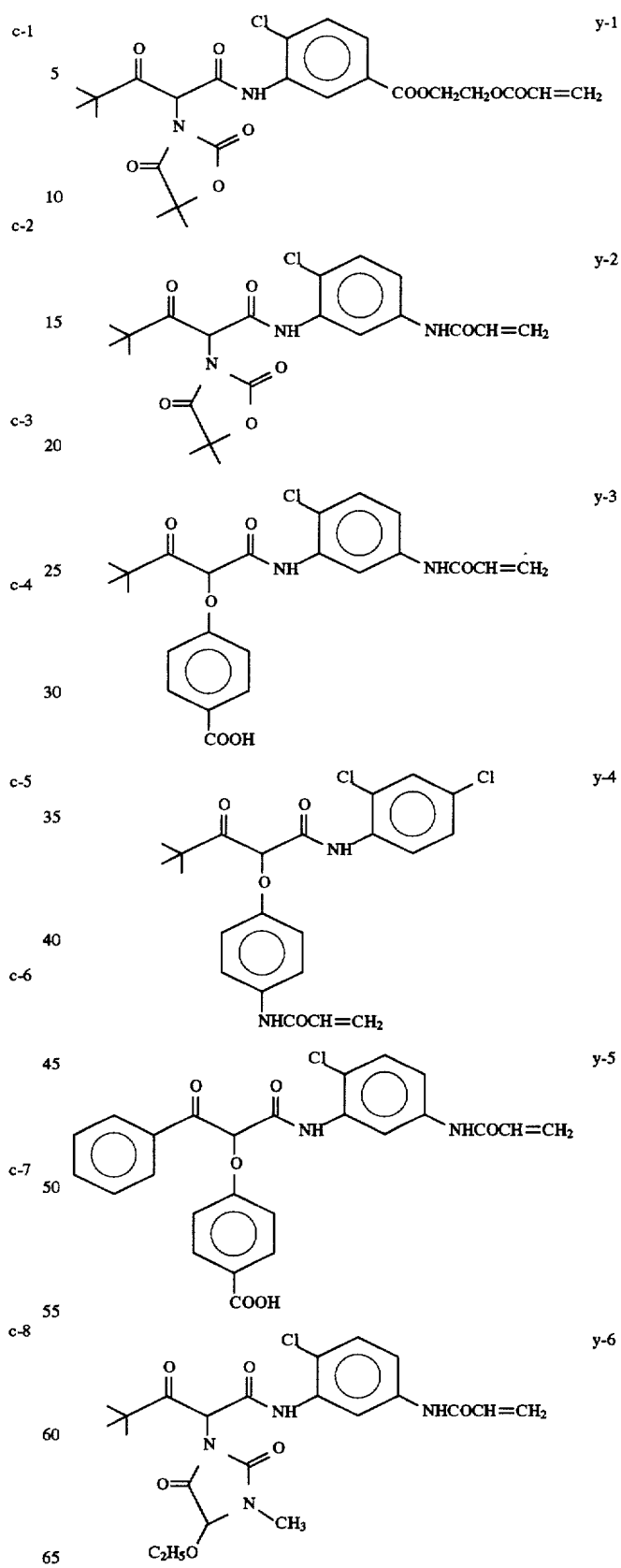

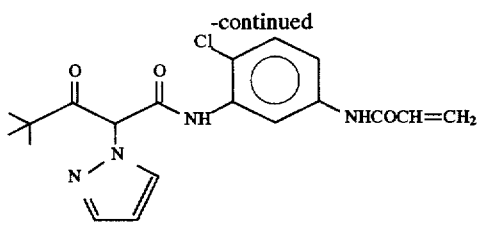

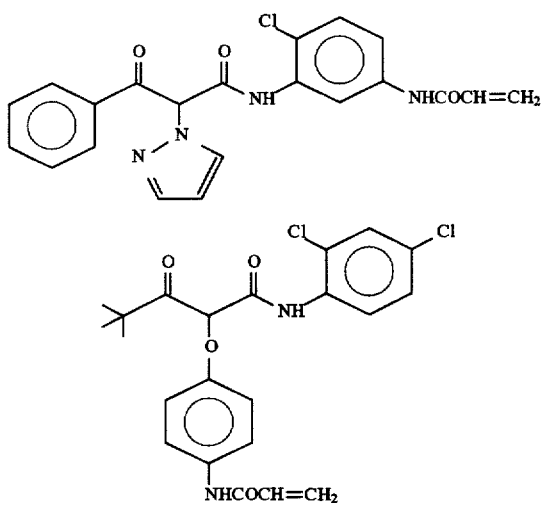

Typical synthetic procedures of the polymers of this invention are described below.

Example 1

Polymeric UV Absorber

Latex of terpolymer of n-butyl acrylate, 2-acrylamido-2-methyl propane sulfonic acid, and 2-hydroxy-4-(4-vinylbenzyloxy)phenyl-2H-benzotriazole (monomer UV-1, m.p=146°–147° C.)

A solid dispersion or slurry comprising 1442.2 g of 2-hydroxy-4-(4-vinylbenzyloxy)phenyl-2H-benzotriazole, 115.5 g of sodium alpha-olefin sulfonate (Rhodacal A246L by Rhone-Poulenc, 40% solid), 83.0 g of 2-acrylamido-2-methyl propane sulfonic acid, sodium salt (trade name Lubrizol 1405 by Lubrizol, 58% solid in water), 48.7 g of $K_2S_2O_8$, and 8400 g of deionized water was prepared by milling the mixture of the above chemicals for 10 minutes using a laboratory scale homogenizer until a fine dispersion was obtained. The slurry was stirred to prevent it from settling. A 12L 4-neck Morton flask equipped with nitrogen inlet, mechanical lab stirrer, and condenser was charged with 1400 g of deionized water and 12.8 g of Rhodacal A246L. The reactor was heated to 80° C. while purging with nitrogen for 30 mins. 2.52 g of $K_2S_2O_8$ was added to the reactor and stirred for 5 mins. The solid dispersion was pumped into the reactor over five hours concurrently with a second feed stream of 38.45 g of butyl acrylate monomer. The total polymerization time was 8 hrs. The latex was cooled and filtered.

The % solids of the latex was measured by a microwave balance (by CEM corp., model CV 80). Z-Average particle size of the latex was measured by Malvern's Autosizer II. Yield of the polymerization was calculated by dividing the total amount of polymer obtained by the total amount of monomers charged to the reactor.

Yield of polymerization: 98.4%

% Solid: 20.8%

Average particle size: 85 nm.

The experimental setup and the analysis of the latex of the following examples were similar to that of the example 1 unless otherwise indicated.

Example 2

Polymeric UV Absorber—Pilot Scale

Latex of terpolymer of n-butyl acrylate, 2-acrylamido-methyl propane sulfonic acid, and 2-hydroxy-4-(4-vinylbenzyloxy)phenyl-2H-benzotriazole (monomer UV-1, m.p=146°–147° C.)

To a head tank vessel (a vessel where reactants are stored and/or processed prior to being fed to the reactor), 33.55 kg of deionized water and 4.46 kg of a commercial surfactant, Alipal EP-120 (Rhone-Poulenc Trade Name for a 30% aqueous solution of the ammonium salt of nonylphenoxypoly(ethyleneoxy)ethanol), were added. A high shear pump, a Ross Mixer, was connected to the bottom valve with its outlet flow returned to the head tank. The pump was turned on and it ran at a rate of 10 gallons per minute. 8.0 kg of 2-hydroxy-4-(4-vinylbenzyloxy)phenyl-2H-benzotriazole solid powder were added to the head tank at a rate of 0.2 to 1.0 kg/minute while the Ross Mixer was recirculating. This formed a 16 weight percent solids slurry.

The Ross Mixer pump was run for 20 minutes after the end of the solid addition. This ensured that the slurry circulated through the shearing device at least 3 to 5 times. After the slurry was formed, the head tank was stirred to prevent the slurry from settling. 450.5 g of Lubrizol 2405A (Trade Name for a 50% aqueous solution of 2-acrylamido-2-methyl propane sulfonic acid, sodium salt) and 140.6 g of potassium persulfate were dissolved into the head tank slurry. The resulting slurry was pumped semi-continuously over 300 minutes into a reactor at 80° C. that had been previously charged with 18 kg of deionized water, 164 g of the surfactant Alipal EP-120, and 52 g potassium persulfate under nitrogen. 5.91 kg of butyl acrylate were added concurrently from a second head tank to form a copolymer with UV-1. The total polymerization time was 8 hours. The latex was cooled and filtered.

Yield of Polymerization: 97%

% Solid: 20.0%

Average particle size: 55 nm

Example 3

Polymeric UV Absorber

Latex of 2-hydroxy-4-(4-vinylbenzyloxy)phenyl-2H-benzotriazole (UV-1, m.p=146°–147° C.) and n-butyl acrylate A solid dispersion or-slurry comprising 229 g of 2-hydroxy-4-(4-vinylbenzyloxy)phenyl-2H-benzotriazole, 32 g of Aerosol OT (Dioctyl ester of sodium sulfosuccinnic acid by American Cyanamide), 3.79 g of ammonium persulfate, and 1168 g of water was prepared by milling the mixture of the above chemicals for 10 minutes using a Ross mixer until a fine dispersion was obtained. The slurry was stirred all the time to prevent it from settling. A 2L 4-neck Morton flask equipped with nitrogen inlet, mechanical lab stirrer, and condenser was charged with 392 g of deionized water and 8 g of Aerosol OT. The reactor was heated to 80° C. while purging with nitrogen for 30 minutes. 0.95 g of ammonium persulfate was added to the reactor and stirred for 5 mins. The solid dispersion was pumped into the reactor over five hours concurrently with a second feed stream of 171 g of n-butyl acrylate monomer. The total polymerization time was 8 hours. The latex was cooled and filtered.

Yield of Polymerization: 91.4%

% Solid: 20.1%

Average particle size: 33 nm

Example 4

Polymeric UV Absorber

Latex of copolymer of 2-hydroxy-5-methacryloylphenyl-2H-benzotriazole (monomer UV-2, m.p.=96°–97° C.), ethacrylic acid, and 2-ethoxyethylacrylate The experimental setup was same as Example 1. A slurry of 29.1 g of 2-hydroxy-5-methacryloylphenyl-2H-benzotriazole, 7.27 g of sodium alpha-olefin sulfonate (Rhodacal A246L by Rhone-Poulenc, 40% solid), 0.756 g of methacrylic acid, 17.1 g of 5% $K_2S_2O_8$, and 100 g of deionized water was prepared as in Example 1. This solid dispersion was pumped concurrently with a second stream of pure 12.98 g of 2-ethoxyethyl acrylate monomer over two hours into an 80° C. 500 mL reactor that had been charged with 20 g of deionized water, 0.75 g of Rhodacal A246L, and 1 g of 5% $K_2S_2O_8$. The total polymerization time was 4 hours. The latex was cooled and filtered.

Yield of Polymerization: 99.6%

% Solid: 27%

Average particle size: 77 nm

Example 5

Polymeric Magenta Coupler

Latex of copolymer of 1-(2,4,6-trichlorophenyl)-3-acryloamido-2-pyrazolin-5-one (monomer M-10, m.p=205°–206° C.) and butyl acrylate The experimental setup was same as Example 1. A slurry of 13.3 g of 1-(2,4,6-trichlorophenyl)-3-acryloamido-2-pyrazolin-5-one, 3.2 g of Igepon T-33 (sodiem N-methyl-N-oleoyl taurate, trade name of Rhone-Poulenc, 30% solid), 2.4 g of 5% sodium persulfate, and 80 g of deionized water was prepared as in the previous example. This solid dispersion was pumped concurrently with a second stream of 12.25 g n-butyl acrylate monomer over six hours into an 90° C. 500 mL reactor that had been charged with 14 g of deionized water, 0.8 g Igepon T-33, and 2.4 g of 5% $Na_2S_2O_8$. The total polymerization time was 8 hours. The latex was cooled and filtered.

Yield of Polymerization: 94.2%

% Solid: 15.9%

Average particle size: 110 nm

Example 6

Polymeric Cyan Coupler

Latex of copolymer of (2,4-dichloro)-3-ethyl-5-acryloamidophenol (monomer C-1, m.p=139°–140° C.) and n-butyl acrylate The experimental setup was same as Example 1. A slurry of 13 g of (2,4-dichloro)-3-ethyl-5-acryloamido-phenol), 2.6 g of Rhodacal A-246L, 2.6 g of 5% sodium persulfate, and 80 g of deionized water was prepared as in previous example. This solid dispersion was pumped concurrently with a second stream of 12.82 g n-butyl acrylate monomer over six hours into an 80° C., 500 mL reactor that had been charged with 14 g of deionized water, 0.65 g of Rhodacal A-246L, and 2.6 g of 5% $Na_2S_2O_8$. Total polymerization time was 8 hours. Latex was cooled and filtered.

Yield of Polymerization: 95.7%

% Solid: 19.3%

Average particle size: 56 nm

Example 7

General Polymer

Latex of homopolymer of t-butylacrylamide (m.p=128°–130° C.)

The experimental setup was same as Example 1. A slurry of 594 g of Monomer 3, 28 g of Rhodacal A246L, and 1076 g deionized water was prepared using the same method as in Examples 1 and 2. 1543 g of the above slurry were delivered over two hours to an 80° C. reactor charged with 8.4 g of Rhodacal A246L and 0.54 g $K_2S_2O_8$ dissolved in 249 g deionized water. After the feed, the mixture was held at 80° C. overnight and then cooled and filtered.

Yield of Polymerization: 99%

% Solid: 29.6%

Average particle size: 72 nm

COMPARISON EXAMPLES

Comparison Example 1

Polymeric UV Absorber—based on method disclosed in U.S. Pat. No. 3,926,436 using surfactant-type monomer and batch process Latex of terpolymer of 2-hydroxy-4-(4-vinylbenzyloxy) phenyl-2H-benzotriazole (monomer UV-1) of 2-sulfoethylmethacrylate, and butyl acrylate A suspension of 350 mL of deionized water, 51.5 g of 2-hydroxy-4-(4-vinylbenzyloxy)phenyl-2H-benzotriazole and 3.22 g of 2-sulfoethylmethacrylate was stirred for 30 min. while purging with nitrogen and heated to 50° C. After addition of 12.82 g of butyl acrylate the mixture was heated to 90° C. and 12.5 ml of 1% aqueous solution of 4,4'-azo-bis(4-cyanovaleric acid) were added. After 10 min., 25.63 g of butyl acrylate and 37.5 mL of 1% aqueous solution of 4,4'azo-bis(4-cyanovaleric acid) were added dropwise in 30 min. Polymerized for another 30 min. after all ingredients were added. Latex was cooled and filtered.

Yield of Polymerization: 50.7%

% Solid: 13.2%

Average particle size: 272 nm

Comparison Example 2

Polymeric UV Absorber—Batch Process Without Cosolvent

Latex of terpolymer of n-butyl acrylate, 2-acrylamido-2-methyl propane sulfonic acid, and 2-hydroxy-4-(4-vinylbenzyloxy)phenyl-2H-benzotriazole (monomer UV-1)

100 g of deionized water, 1.18 g of Alipal EP-120, 0.687 g of Lubrizol 2405A, 3.43 g of Monomer UV-1, and 1.28 g of butyl acrylate were mixed in a 0.25L 4-neck round bottom flask equipped with a mechanical stirrer, nitrogen inlet, and a reflux condenser. The flask was immersed in an 80° C. constant temperature bath and heated for 30 minutes with nitrogen purge. 2 g of 5% $(NH_4)_2S_2O_8$ was added and the polymerization was allowed to continue for 8 hours. Product was latex plus finely dispersed precipitate. Latex was cooled and filtered.

Yield of Polymerization: 65%

% Solid: 17.4%

Average particle size: 106 nm

Comparison Example 3

Polymeric UV Absorber—based on method disclosed in U.S. Pat. No. 3,926,436—Surfactant monomer and batch process Latex of terpolymer of 2-ethoxyethylacrylate, 2-acrylamido-2-methyl propane sulfonic acid, and 2-hydroxy-5-methacryloylphenyl-2H-benzotriazole(UV-2)

120 mL of deionized water, 8.28 g of Rhodacal A246L (a-olefin sulfonate, 40% in water), 0.50 g of sodium bicarbonate, 29.1 g of 2-hydroxy-5-methacryloylphenyl-2H-benzotriazole, 12.98 g of 2-ethoxyethylacrylate, and 3.55 g of 2-acrylamido-2-methyl propane sulfonic acid, sodium salt (Lubrizol 2405A by Lubrizol, 58% aqueous solution) were mixed in a 250 mL 3-neck round bottom flask. The suspension was purged with nitrogen for 30 minutes while heated to 80° C. with a constant temperature bath. 13.25 g of 5% potassium persulfate was added to initiate the polymerization. 4.4 g of 5% potassium persulfate was further added after two hours. The latex was cooled and filtered.

Yield of Polymerization: 70.5%

% Solid: 17.4%

Average particle size: 154 nm

Comparison Example 4

(BB2079-169)—Polymeric UV Absorber—Polymerization With Organic Cosolvent-based on U.S. Pat. No. 4,080,211

Latex of copolymer of 2-hydroxy-5-methacryloylphenyl2H-benzotriazole(UV-2), 2-ethoxyethylacrylate, and methacrylic acid 360mL of deionized water, 3.15 g of a 34% aqueous solution of Aerosol A-103 (trade name for disodium ethoxylated nonylphenol half ester of sulfosuccinic acid), and 40 mL of acetone were mixed in a 1L 4-neck round bottom flask equipped with an agitator, nitrogen inlet, and a reflux condenser. The flask was immersed in an 80° C. constant temperature bath, and heated for 30 minutes with nitrogen purge. 9.69 g of 2-hydroxy-5-methacryloylphenyl-2H-benzotriazole(UV-2) and 4.33 g of 2-ethoxyethyl acrylate, and 0.26 g of methacrylic acid were dissolved in 180 mL of N,N-dimethylformamide. 5.71 g of 5% ammonium persulfate were added to the reactor and stirred for 3 minutes. The monomer solution and another co-feed solution containing 1.05 g of Aerosol A-103, 2.9 g of 5% $Na_2S_2O_8$ and 100 mL deionized water were pumped concurrently into the reactor over 4½ hours after which the reactor was held at 80° C. for 8 hours. Latex was cooled and filtered to remove the coagulum.

Yield of Polymerization: 34.2%

% Solid: 2.0%

Average particle size: 253 nm

Coagulum: 9.4g

Comparison Example 5

Polymeric Magenta Coupler—Polymerization With Organic Cosolvent-based on U.S. Pat. No. 4,080,211

Latex of copolymer of 1-(2,4,6-trichlorophenyl)-3-acryloamido-2-pyrazolin-5-one (monomer M-10) and butyl acrylate 35 mL of deionized water, 15 mL of methanol, and 0.81 g of Alipal EP-120 (Rhane-Poulenc Trade Name for a 30% aqueous solution of the ammonium salt of nonylphenoxy poly(ethyleneoxy)ethanol), were mixed in a 0.5L 4-neck round bottom flask equipped with an agitator, nitrogen inlet, and a reflux condenser. The flask was immersed in an 80° C. constant temperature bath, and heated for 30 minutes with nitrogen purge. 3.4 g of monomer M-32 and 1.44 g of 2-ethoxyethyl acrylate were dissolved in 15 mL of N,N-dimethylformamide. 0.49 g of 5% $(NH_4)_2S_2O_8$ were added to the reactor and stirred for 3 minutes. The monomer solution and an aqueous solution comprising 0.32 g of EP-120, 0.49 g of 5% $(NH_4)_2S_2O_8$ and 10 mL of water were pumped concurrently into the reactor over 5 hours after which the reactor was held at 80° C. for 8 hours. Latex completely coagulated near the end of polymerization.

Yield: 0%.

Comparison Example 6

Polymeric Cyan Coupler—Polymerization With Organic Cosolvent-based on U.S. Pat. No. 4,080,211

Latex of copolymer of (2,4-dichloro)-3-ethyl-5-acryloamidophenol (C-1) and butyl acrylate 180 mL of deionized water, 20 mL of methanol, and 1 g of Igepon T-77 (trade name for sodium N-methyl-N-oleoyltaurate) were mixed in a 0.5L 4-neck round bottom flask equipped with an agitator, nitrogen inlet, and a reflux condenser. The flask was immersed in an 80° C. constant temperature bath, and heated for 30 minutes with nitrogen purge. 6 g of monomer C-1 and 8.17 g of 2-ethoxyethyl acrylate, 0.75 g of methacrylic acid, 0.075 g of 2-acrylamido-2-methyl propane sulfonic acid were dissolved in 60 mL of methanol. 0.3 g of VA-80 (2,2'-azobis (2-methyl-N-(1,1-bis(hydroxymethyl)-2-hydroxymethylethyl) propionamide, (trade name of Wako Pure Chemical Ind.) were added to the reactor and stirred for 3 minutes. The monomer solution and an aqueous solution comprising 0.4 g of Igepon T-77, 0.3 g of VA-80 and 60 ML of deionized water were pumped concurrently into the reactor over 5 hours after which the reactor was held at 80° C. for 8 hours. The latex completely coagulated near the end of polymerization.

Yield: 0%.

The results from the examples of this invention and comparison examples are summarized in the following table:

| Polymer No. | Solid Monomer | Liquid Hydrophobic Monomer | Ionic Comonomer | % solid | Particle size (nm) | % Yield | Remark |
| --- | --- | --- | --- | --- | --- | --- | --- |
| Example 1 | UV-1 | Butyl acrylate | Lubrizol 2405 | 20.8 | 85 | 98.4 | Invention |
| Example 2 | UV-1 | Butyl acrylate | Lubrizol 2405 | 20.0 | 55 | 97 | Invention |
| Example 3 | UV-1 | Butyl Acrylate | none | 20.1 | 33 | 91.4 | Invention |

-continued

| Polymer No. | Solid Monomer | Liquid Hydrophobic Monomer | Ionic Comonomer | % solid | Particle size (nm) | % Yield | Remark |
|---|---|---|---|---|---|---|---|
| Example 4 | UV-2 | 2-Ethoxyethyl acrylate | none | 27.0 | 77 | 99.6 | Invention |
| Example 5 | M-1 | Butyl acrylate | none | 15.9 | 110 | 94.2 | Invention |
| Example 6 | C-1 | Butyl acrylate | none | 19.3 | 56 | 95.7 | Invention |
| Example 7 | t-Butyl acrylamide | none | none | 29.6 | 72 | 99.0 | Invention |
| Comparison example 1 | UV-1 | none | 2-sulfoethyl methacrylate | 13.2 | 272 | 50.7 | U.S. Pat. No. 3,926,436 |
| Comparison example 2 | UV-1 | Butyl acrylate | Lubrizol 2405 | 17.4 | 106 | 65 | |
| Comparison example 3 | UV-2 | 2-Ethoxyethyl acrylate | Lubrizol 2405 | 17.4 | 154 | 70.5 | U.S. Pat. No. 3,926,436 |
| Comparison example 4 | UV-2 | 2-Ethoxyethyl acrylate | none | 20.0 | 253 | 34.2 | U.S. Pat. No. 4,080,211 |
| Comparison example 5 | M-1 | 2-Ethoxyethyl acrylate | none | 0 | NA | 0 | U.S. Pat. No. 4,080,211 |
| Comparison example 6 | C-1 | 2-Ethoxyethyl acrylate | Lubrizol 2405 | 0 | NA | 0 | U.S. Pat. No. 4,080,211 |

*Lubrizol 2405 = 58% aqueous solution of 2-acrylamido-2-methyl propane sulfonic acid, sodium salt.

It is clear that the polymerization method of this invention is superior to any method described in the prior art. Comparison of Examples 1 and 2 with Comparison Examples 1, 2, and 3 which were derived from UV absorbing monomer UV-1, demonstrate that the methods of this invention have the advantage of generating high yield of polymerization, and small particle size. Comparison of Example 4 and Comparison Example 3 and 4, which were derived from UV absorbing monomer UV-2, demonstrate that the method of this invention has the advantage of generating high % solid, high yield of polymerization, and small particle size latex without the use of organic solvent or ionic comonomer. Examples 5 to 7 show that the same high quality latexes can be made from magenta coupler monomer M-1, and cyan coupler monomer C-1 and t-butylacrylamide. On the other hand, when the method described in U.S. Pat. No. 4,080,211 was used, latex coagulated completely because of the presence of organic solvent (Comparison Examples 5 and 6). This invention does not need the use of ionic comonomers as described in U.S. Pat. No. 3,926,436 and U.S. Pat. No. 4,340,664. Polymer generated by the batch process described in U.S. Pat. No. 3,926,436 and U.S. Pat. No. 4,340,664, instead of semi-continuous method in this invention, also create uncertainty in the final polymer composition.

The method of this invention has the following advantages:

1) no need of organic solvents which increase manufacturing cost and deteriorate latex stability;

2) no need of exotic ionic comonomer;

3) no need of heating solid monomer above its melting point which may cause premature polymerization;

4) easy heat dissipation;

5) excellent control in polymer composition;

6) high % solid and no need for expensive diafiltration process;

7) high yield of polymerization.

This process has been demonstrated to work with a variety of solid monomers and surfactant systems.

The invention has been described in detail with particular reference to preferred embodiments thereof, but it will be understood that variations and modifications can be effected within the spirit and scope of the invention.

We claim:

1. A process to form polymer latex from a water-insoluble, ethylenically unsaturated solid monomer, which is capable of undergoing free radical addition polymerization, which comprises the steps of: dispersing a water-insoluble, ethylenically unsaturated, solid monomer in water containing surfactant and water soluble initiator to form a stable solid monomer dispersion, and pumping the dispersion semi-continuously to a batch polymerization reactor where the solid monomer reacts to form a polymer latex, wherein said polymerization occurs at a temperature below the melting point of the solid monomer.

2. A process to form copolymer latex by the copolymerization of water-insoluble, ethylenically unsaturated solid monomer and water-insoluble, ethylenically unsaturated liquid monomer, which comprises the steps of: dispersing a water-insoluble, ethylenically unsaturated, solid monomer (s) in water to form a stable solid monomer dispersion, and pumping each of the solid dispersion and the water-insoluble, ethylenically unsaturated liquid monomer to a batch polymerization reactor where the solid monomers react to form a copolymer latex, wherein said polymerization occurs at a temperature below the melting point of the solid monomer.

3. A process as in claim 1 wherein the ethylenically unsaturated, solid monomer comprises at least one member selected from the group consisting of UV absorbers, visible filter dyes, optical brighteners, oxidized developer scavengers, silver halide solvents, silver halide developers, sensitizing dyes for silver halides, image stabilizers, foaming agents, anti-fogging agents, chemical stabilizers, and antioxidants.

4. A process as in claim 1 wherein said ethylenically unsaturated, solid monomer comprises a UV absorber.

5. A process as in claim 1 wherein said ethylenically unsaturated, solid monomer comprises a magenta, cyan, or yellow coupler.

6. A process as in claim 2 wherein said water-insoluble, ethylenically unsaturated liquid monomer comprises $C_1$–$C_8$ linear or branched alkyl acrylate or alkyl methacrylate.

7. A process as in claim 1 wherein the concentration of solid monomer is 0.5 to 50% by weight of the dispersion.

8. A process as in claim 1 wherein the concentration of solid monomer is 5 to 40% by weight of the dispersion.

9. A process as in claim 1 wherein the solid monomer is dispersed in water containing buffer.

10. A process as in claim 9 wherein the concentration of surfactant used is between 1 to 5% by weight of the total monomers.

11. A process as in claim 9 wherein the concentration of buffer used is up to 5%.

12. A process as in claim 9 where the concentration of polymerization initiator is between 1 to 2% by weight of the total monomer.

13. A process as in claim 1 wherein the temperature of the batch polymerization reactor is between about 60° C. to 90° C.

14. A process as in claim 1 wherein an ethylenically unsaturated, water-soluble comonomer is dissolved in the solid dispersion which is then pumped to the polymerization reactor to form a copolymer latex.

15. A process as in claim 1 wherein said solid monomer comprises more than one ethylenically unsaturated, water-insoluble solid monomer co-dispersed in said water prior to pumping to said reactor to form a copolymer latex.

16. A process as in claim 2 wherein further comprising a water-insoluble polymerization initiator dissolved in the ethylenically unsaturated, water-insoluble, liquid comonomer.

17. A process as in claim 16 wherein the concentration of water-insoluble initiator is between 0.1 and 2% by weight of the total ethylenically unsaturated monomers.

18. A process as in claim 2 wherein more than one ethylenically unsaturated, water-insoluble, liquid comonomers is mixed together and pumped concurrently to the batch polymerization reactor with the solid monomer dispersion.

19. A process as in claim 1 wherein said solid dispersion is fed to a continuous polymerization reactor.

20. A process as in claim 19 wherein the continuous polymerization reactor is a continuous stirred tank reactor (CSTR).

21. A process as in claim 1 wherein the polymer latex comprises particles of an average particle diameter of from about 0.02 to 0.5 mm.

22. A process as in claim 1 wherein said polymer latex comprises a percent solids of from 5 to 40%.

23. A process as in claim 1 wherein the number and weight average molecular weight of said latex polymer comprises between about 5,000 to about 500,000 and about 10,000 to about 2,000,000 respectively.

24. A process as in claim 1 wherein a water-soluble chain transfer agent is added to the solid monomer dispersion or to the batch polymerization reactor.

25. A process as in claim 24 wherein said water-soluble chain transfer agent is selected from a group consisting of water-miscible ketones, alcohols, and acids.

26. A process as in claim 2 wherein a chain transfer agent is added to said water-insoluble liquid monomers.

27. A process as in claim 26 wherein the chain transfer agent is selected from the group consisting of mercaptans and halogenated hydrocarbons.

28. A process as in claim 26 wherein said chain transfer agent comprises carbon tetrachloride, butylmercaptan, or laurylmercaptan.

29. A process as in claim 4 wherein said solid UV monomer is derived from at least one of 2-hydroxyphenyl benzotriazole, 2-hydroxybenzophenone, benzylidene malonate, ester of α-cyanocinnamic acid, and malononitrile.

30. A method of polymerization comprising providing a stream of fine solid monomer particles dispersed in water; bringing said solid monomer particle stream into contact with an aqueous initiator solution at a rate such that it immediately reacts to form polymer particles in said water to form a latex emulsion, wherein said polymerization occurs at a temperature below the melting point of the solid monomer particles.

31. The method of claim 30 wherein simultaneously with bringing said monomer particle stream into contact with said aqueous initiator a stream of liquid monomer is also brought into contact with said aqueous initiator such that a copolymer is formed.

32. A method of claim 30 wherein said solid monomer particles comprise two different monomers that form a copolymer latex emulsion.

33. A method of claim 30 wherein said initiator solution is always in a monomer starved condition such that monomers brought into contact with said initiator solution immediately reacts to form polymer.

34. The method of claim 30 wherein the particles of said particle monomer stream have a particle size distribution of between about 2000 and 5 micrometers.

35. The method of claim 30 wherein said polymer particles comprise a photographically useful material.

36. The method of claim 33 wherein said particles have a size distribution between 500 and 10 micrometers.

37. The method of claim 30 wherein said initiator solution comprises sodium persulfate.

* * * * *